Dec. 20, 1938.  A. E. JOHANSON  2,140,748
WRAPPER FOR CHEWING GUM
Filed Jan. 23, 1936
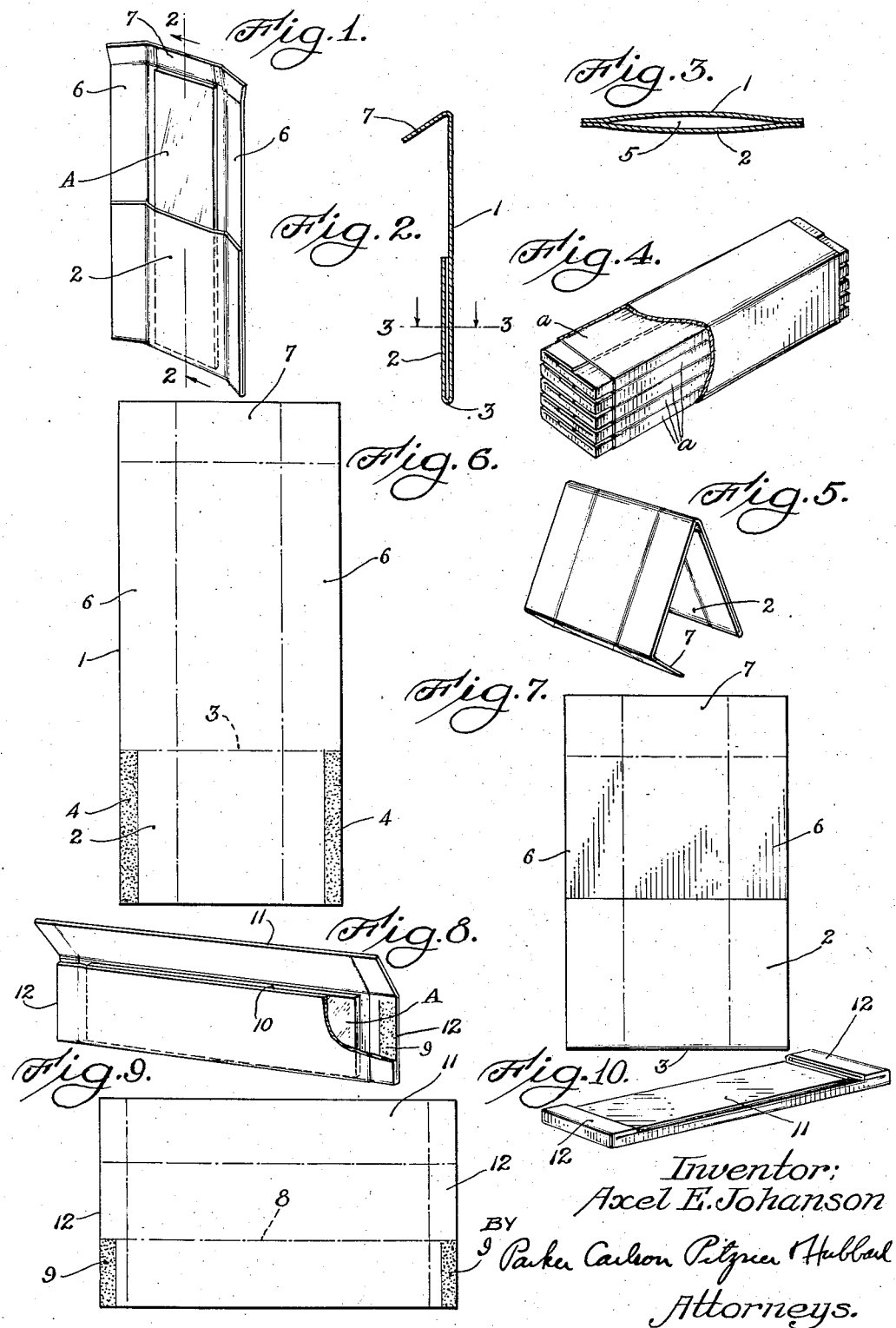
Inventor:
Axel E. Johanson
BY Parker Carlson Pitzner Hubbard
Attorneys.

Patented Dec. 20, 1938

2,140,748

UNITED STATES PATENT OFFICE 2,140,748

WRAPPER FOR CHEWING GUM

Axel E. Johanson, Chicago, Ill.

Application January 23, 1936, Serial No. 60,361

5 Claims. (Cl. 229—87)

The disposal of used chewing gum is often an annoying problem to the users as well as to those coming in contact with it. It is a common practice to attach the wad of gum, for the lack of a better place, to the lower side of seats, tables and other furniture in public places. This often causes embarrassment to the person so disposing of the gum and also results in expense to the owner of the premises and discomfort to persons coming into contact with the gum. It is also a practice of some inconsiderate chewers merely to throw the wad of gum on the sidewalk, floor or carpet, where it may be stepped upon and picked up by the sole of the shoe of some other person, much to the latter's disgust.

It is also a fact that children often wish to save a piece of gum, after chewing it for awhile. Without a suitable container in which to save it, the child will hold it in his grimy hands or even put it in his pocket where it will come in contact with dirt and germs.

Manufacturers of chewing gum commonly wrap each stick in a piece of waxed paper or tinfoil, after which the stick is placed in an outside wrapper that is open at both ends and virtually constitutes a flat, open-ended tube. Purchasers are urged to use this outside tubular wrapper as a receptacle for the gum after the latter has been chewed; but apparently little, if any, use is made thereof by the public. Such a tubular wrapper is too small in diameter to permit of the ready insertion of a wad of gum; if the wrapper becomes torn it is too small and irregular in form to serve as a complete and secure enclosure for the wad, especially if the gum has been only partially chewed and the user desires to keep it in fit condition for further chewing.

My invention is addressed to the provision of an inside wrapper which, after it has served its initial purpose, shall constitute a convenient and sanitary receptacle for the gum after the latter has been partially chewed or is to be discarded.

In the accompanying drawing,

Figures 1 to 7 illustrate one form of wrapper embodying the invention, Fig. 1 being a perspective view of a stick of chewing gum encased in the wrapper, the wrapper being shown as unfolded to expose the gum.

Fig. 2 is a view of the wraper alone, taken in the plane of line 2—2 of Fig. 1.

Fig. 3 is a section on line 3—3 of Fig. 2.

Fig. 4 is a perspective view of a commercial package consisting of five sticks of gum, each encased in a wraper embodying the present invention.

Fig. 5 is a perspective view of the wrapper showing how it may be folded after the chewed gum has been placed therein.

Fig. 6 is a plan view of the blank from which the wrapper is formed.

Fig. 7 is a plan view of the wrapper.

Figs. 8, 9 and 10 are views of a somewhat different form of wrapper, Fig. 8 being a fragmental perspective view of the wrapper with a stick of gum therein, and Fig. 9 being a plan view of the blank. Fig. 10 is a view of the wrapper folded to enclose a stick of gum.

In the drawing, the letter A denotes a stick of gum which may be of the ordinary form and dimensions.

Referring first to the form of wrapper shown in Figs. 1 to 7: The wrapper is formed from a rectangular blank 1 (Fig. 6) of waxed paper, "Cellophane", tinfoil or other suitable sheet material. One end portion 2 of the blank is folded upon the line 3 into contact with the body of the blank 1, the side edges of the portion 2 being secured to the body or blank 1 in any desired manner, as by means of adhesive indicated by the numerals 4 in Fig. 6. A pocket 5 is thus formed between the parts 1 and 2, as shown in Fig. 3, to receive one end of a stick of gum.

As shown in Fig. 1, the wrapper is of such width and length as to provide side portions 6 and an end portion 7 which extend beyond the perimeter of the stick of gum. After the stick has been inserted into the pocket 5, as shown in Fig. 1, the side portions 6 and the end portion 7 may be folded to form a complete enclosure for the gum. The whole may then be placed in an ordinary outside wrapper $a$.

Sticks of gum, individually wrapped as just described, may be packed in groups of five, as is usual in the trade, Fig. 4 being a perspective view of such a package.

The wrapper constitutes a convenient and secure receptacle for the gum after it has been chewed. After the chewed gum has been placed in the pocket 5 the upper portion of the wrapper may be folded alongside the pocket and the end portion 7 may be folded around the lower end of the pocket, following the procedure indicated in Fig. 5. In order that the pocket 5 containing the chewed gum shall be securely closed, it is preferable that the depth of the pocket shall be approximately equal to half the length of the stick of gum, thus making the upper portion of the wrapper sufficiently long to fold down alongside the pocket and around under the lower end of the pocket.

In Figs. 8, 9 and 10, there is shown an alternative form which is essentially similar to that shown in Figs. 1 to 7, the principal difference being that the pocket is made sufficiently wide and shallow to receive the entire stick. The blank from which the wrapper is formed is shown in Fig. 9 and consists of a rectangular piece of paper or the like which may be folded along the line 8 and secured by means of adhesive 9 to form a pocket 10. Above the pocket 10 is a flap 11 which may be folded down alongside the pocket to close the latter. The end portions 12 of the wrapper extend beyond the ends of the stick and may be folded as shown in Fig. 10 to hold the flap 11 in place. It will be understood that the pocket 10 serves as a receptacle for chewed gum.

With a wrapper of either of the forms herein shown, the many annoyances arising because of careless disposal of the chewed gum would be eliminated. The pocket formed in the wrapper is of sufficient size to make it easy to insert a wad of gum therein. Moreover, when the wad of gum is inserted in the pocket, the flap is of sufficient size to completely cover the gum. Thus, gum inserted in such a wrapper, when thrown on the floor, cannot adhere to the sole of a shoe, or cause other difficulty. In the case of a child wishing to save a piece of gum for rechewing, a wrapper embodying the features of the present invention provides a sanitary container for the gum. The waxed surface of the pocket also prevents the chewed gum from sticking to the wrapper.

A wrapper of this character is apt to remain in a person's possession for a longer period of time than the ordinary wrapper and thus has greater advertising value. Moreover, the face of the pocket formed by the end portion 2 in the form shown in Fig. 1, or by the outer face of the portion below the fold 8 in the form shown in Fig. 8, provides additional advertising space.

I claim as my invention:

1. A wrapper for an oblong stick of chewing gum, said wrapper comprising a rectangular piece of sheet material folded parallel to the shorter edges thereof to form a pocket for approximately one-half the length of the stick, the width of said wrapper being greater than the width of the stick so as to provide side portions extending beyond the long edges of the stick, and said wrapper being of sufficient length so as to provide an end portion extending beyond the end of the stick, said side portions and end portion being adapted to be folded to provide a complete overlapping closure for the full stick, and said pocket serving as a receptacle for a half stick or the gum after being chewed, the portion of said wrapper which extends beyond the pocket being adapted to be folded over the pocket to close the latter when used as such a receptacle.

2. An inner wrapper for chewing gum, comprising a piece of sheet material of uniform width folded at one end upon itself to form a permanent pocket having a closed end, two closed sides and an open end adapted to receive a piece of gum or a wad of chewed gum, the portion of said wrapper beyond said pocket comprising a flap at the open end adapted to be folded inwardly with the sides of the pocket and the flap also foldable inwardly in a direction transverse to the folding of the flap, the flap and the foldable sides cooperating to close the open end of the pocket.

3. A wrapper for an oblong stick of chewing gum, said wrapper comprising a pocket the width of which corresponds to the length of the stick, and the depth of which corresponds to the width of the stick, said wrapper further comprising end portions extending beyond the ends of the pocket and a flap adapted to be folded over the pocket and having a width greater than the pocket, said end portions and the ends of said flap being adapted to be folded upon the pocket in a direction transverse to the folding of the flap to securely close the pocket.

4. A wrapper for chewing gum comprising a rectangular sheet of material folded back upon itself to provide a double layer portion and a single layer portion, said portions being of substantially equal area, the side edges of the double layer portion being glued to provide a pocket closed on three edges and open on the fourth and adapted to receive first a flat stick of gum and later a wad of chewed gum, the single layer portion providing an inwardly folding flap, the side edges of both portions being foldable inwardly to hold the flap in its folded position.

5. A wrapper for a flat oblong stick of chewing gum comprising a rectangular piece of sheet material folded back upon itself on a line parallel to the shorter edges thereof for a sufficient distance to form a pocket having a depth approximately equal to one-half the length of the stick, the width of said wrapper being substantially greater than the width of the stick to provide side portions extending beyond the side edges of the stick to be folded inwardly when used with the stick and to provide a pocket of substantial width facilitating the later insertion therein of a chewed wad of gum, said wrapper having sufficient length to provide an end portion beyond the end of the stick foldable inwardly and held in place by the inwardly folded side edges, the portion of the wrapper which extends beyond the pocket being foldable against the face of the pocket to close the latter when only the pocket portion of the wrapper is used.

AXEL E. JOHANSON.